Figure 1:
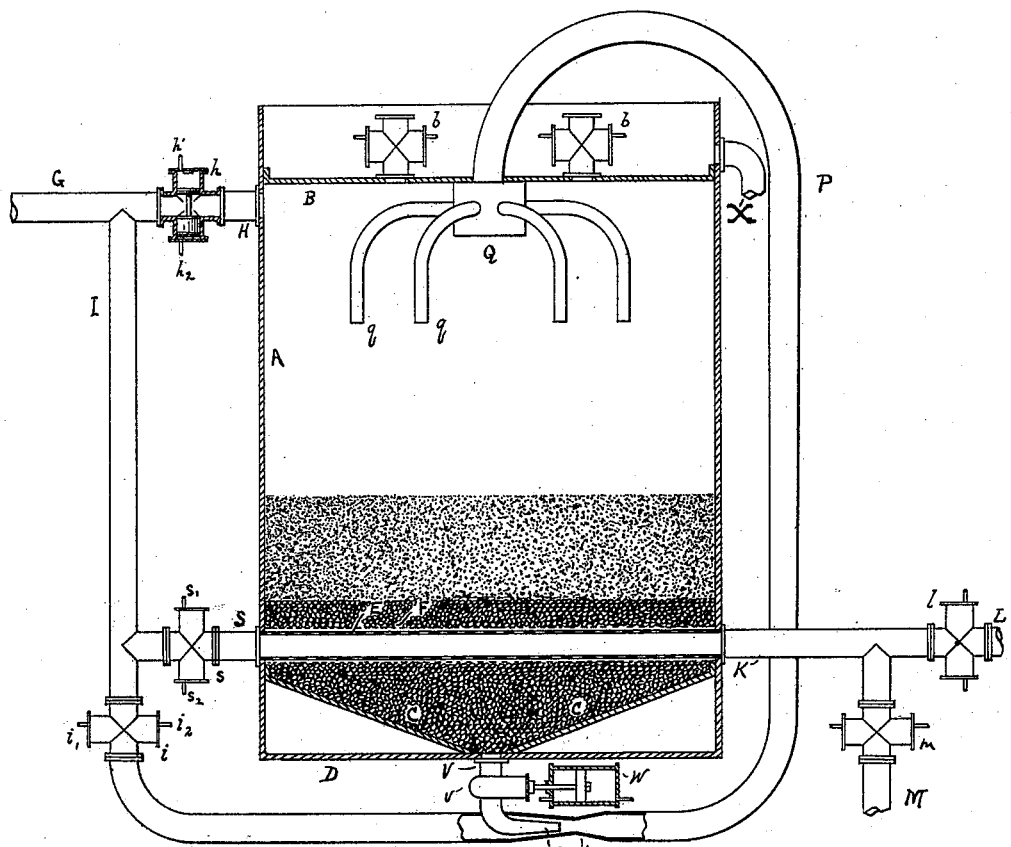

(No Model.) 2 Sheets—Sheet 1.

G. H. MOORE.
APPARATUS FOR CLEANING FILTER BEDS.

No. 395,070. Patented Dec. 25, 1888.

Witnesses
A. G. Holman,
A. T. Chapman.

Inventor
G. H. Moore,
By Hawes & Chapman
Attorneys.

(No Model.) 2 Sheets—Sheet 2.

G. H. MOORE.
APPARATUS FOR CLEANING FILTER BEDS.

No. 395,070. Patented Dec. 25, 1888.

Witnesses—

Inventor—
G. H. Moore.
By Hawes & Chapman
Attorneys.

UNITED STATES PATENT OFFICE.

GEORGE H. MOORE, OF NORWICH, CONNECTICUT.

APPARATUS FOR CLEANING FILTER-BEDS.

SPECIFICATION forming part of Letters Patent No. 395,070, dated December 25, 1888.

Application filed August 5, 1887. Serial No. 246,169. (No model.)

*To all whom it may concern:*

Be it known that I, GEORGE H. MOORE, of Norwich, in the county of New London and State of Connecticut, have invented a new and useful Apparatus for Cleaning Filter-Beds, of which the following is a specification, reference being had to the accompanying drawings, forming part thereof.

This invention relates to the art of cleaning filter-beds by a bodily shifting of the material composing the same and subjecting it to the action of cleansing-water during such shifting movement, as distinguished from a method of effecting such cleansing operation by simply passing a reverse current of cleansing-water through the bed.

The object of my invention is to provide means for quickly and thoroughly effecting the cleansing of filter-beds by shifting the material composing the same from the bottom to the top of the filtering-chamber and causing it to descend through cleansing-water contained within said chamber.

Heretofore the pipe by which such shifting movement of the filtering material has been accomplished has been centrally located within the chamber with its lower end extending to a point slightly above the bottom of said chamber; or when an exterior pipe has been employed it has led from the side of the chamber above the bottom thereof. I have found that such arrangement of the transfer-pipe results in a material prolongation of the time required to effect the shifting movement of the material composing the filter-bed, because of the difficulty encountered in properly directing said material to the mouth of the pipe. In the case of the exterior pipe, which, so far as I am aware, has been used only to shift the filtering material from the filtering-chamber into a separate compartment of the same or another filter, the particles composing the filtering medium must be induced to move from every point of the entire area of the bottom of the filtering-chamber to a single point in the side wall of said chamber where the mouth of the pipe is located, and such movement is materially retarded by the force of gravity, as well as by the obstruction caused by counter-currents of the particles themselves. In the case of the centrally-located interior pipe alluded to this difficulty has been partially overcome by making the bottom of the filtering-chamber in the form of an inverted cone and locating the mouth of the pipe above the lowest point of said bottom; but inasmuch as the particles of filtering medium are compelled to descend to and beneath the bottom of the pipe in order to enter it, such construction causes said particles to become closely massed about the outer surface of the pipe and between it and the inclined bottom of the chamber in a manner to greatly prolong the operation of forcing the filtering medium through said pipe. I have found that these difficulties can be entirely obviated and the shifting movement of the filtering medium accelerated in such manner as to materially reduce the time required to clean the filter-bed, by utilizing an exterior transfer-pipe, the mouth of which is located in the center of the bottom of the filtering-chamber, and by causing said bottom to slope upwardly from the mouth of said pipe to the sides of said chamber. By such arrangement of the pipe the particles composing the filtering medium are drawn directly into said pipe by gravity, in addition to the force exerted by the suction existing at the mouth of the pipe during the shifting movement. Again, the transfer-pipe has heretofore discharged the filtering material into a practically stationary body of water within the filtering-chamber; and it is a further object of my invention to increase the effectiveness of the actual washing process by creating an ascending current of water within the chamber simultaneously with the shifting movement, and thus augment the force with which the cleansing-water is brought into contact with the descending particles composing the filtering medium.

To these ends my invention consists in the apparatus constructed and operating as hereinafter fully described, and particularly pointed out in the claims.

Figure 2:
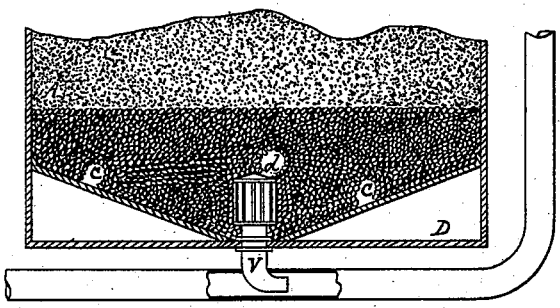
Figure 3:
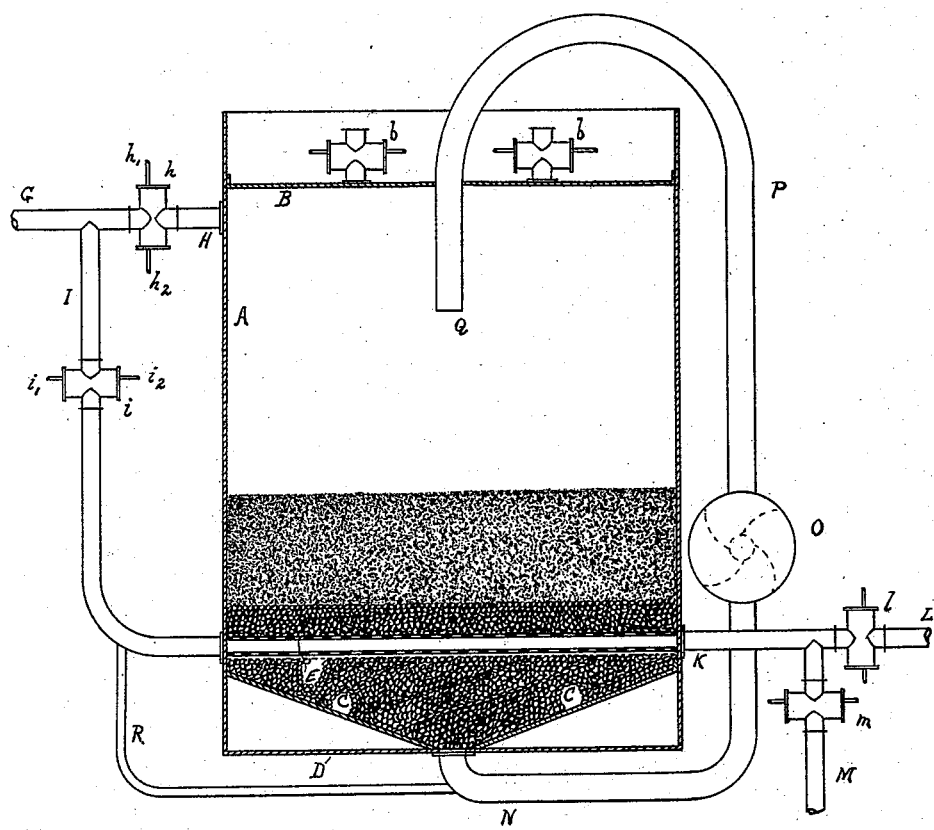

Referring to the drawings, in which like letters designate like parts in the several figures, Figure 1 is a vertical sectional view of a high-pressure filter having connected thereto my novel apparatus. Fig. 2 is a similar view of a slight modification thereof. Fig. 3, in a like view, shows still another modification of the apparatus for shifting the filtering material.

The letter A designates the shell; B, the head; C, the false bottom, and D the true bottom, of the filter. The head B is preferably located a short distance below the top of the shell, as shown, and the false bottom C preferably slopes toward its center at substantially the angle shown for a purpose presently to be described. That portion of the filter between head B and the false bottom forms the filtering-chamber, which contains the filtering material, (not shown,) and from which the filtered water is removed by means of collecting-tubes in the usual manner. As shown, the collecting-tubes are of a common form, consisting of perforated tubes E, covered with wire-gauze F.

Communicating with the filter are a main supply-pipe, G H, leading into the filtering-chamber near the top thereof; a cleansing-water-inlet pipe, I, preferably leading from pipe G H, as shown, and communicating with the collecting-tubes within the chamber by means of a branch pipe, S; a filtered-water-outlet pipe, K L, leading from the collecting-tubes to the point where said filtered water is utilized; a cleansing-water-escape pipe, X, leading from the top of the filter above head B, and a waste-pipe, M, preferably leading from the filtered-water-outlet pipe K L, as shown. Valves are located in said pipes, as follows: Valve $h$ in pipe G H, between the filter and the point of intersection of said pipe with pipe I; valve $i$ in pipe I, below branch pipe S; valve $s$ in pipe S; valve $l$ in pipe K L, beyond pipe M, and valve $m$ in pipe M. Additional valves $b$ are located in head B to govern passages through said head. These valves may all be of any suitable form to be operated manually; but I have shown and prefer to use the form of valve shown, described, and claimed in an application for Letters Patent filed by me on the 20th day of May, A. D. 1887, and serially numbered 238,855, which valve comprises two cylinders located upon opposite sides of the water way or passage through the valve-shell, said cylinders containing pistons with which a gate or closing device consisting of an expansible cylinder is connected in such manner that by the admission of fluid or liquid under pressure to the cylinders alternately said gate or closing device is operated in opposite directions to open and close the valve. The valves constructed in this manner will be connected by pipes $h'$ $h^2$, $i'$ $i^2$, &c., with an apparatus devised by me for automatically regulating the admission of the fluid or liquid under pressure to and its exhaustion from said valves, which apparatus, being shown, described, and claimed in another application for Letters Patent filed by me on the 17th day of June, A. D. 1887, and serially numbered 241,577, need not be described herein.

It will be understood, therefore, that so far as the present invention is concerned the valves $b$ $h$ $i$, &c., may be manually-operated valves; but that they will preferably be constructed as shown and operated automatically as set forth in my last-mentioned application for Letters Patent.

As hereinbefore stated, one of the leading features of the present invention consists in removing the filtering material from the filtering-chamber at the lowest point of the bottom thereof by suction, and immediately returning the same to said chamber at the top thereof, and the preferred form of apparatus devised by me for securing this result is shown in Fig. 1 of the drawings, in which the pipe I is continued beneath the filter, where it is designated by the letters T N, thence upwardly to and over the top of the filter and downwardly through head B, preferably at the center of the latter, the vertical portion of said pipe being designated by the letter P. Instead of making this pipe, which I will term the "transfer-pipe," continuous, as shown, the parts thereof lettered T, N, and P could obviously be separate sections united by suitable couplings.

A pipe, V, leads from the filtering-chamber at the lowest point of false bottom C to and into the transfer-pipe and terminates within the latter in the nozzle $v'$, which nozzle projects into the end of the "double-trumpet" or "hour-glass" conformation of the transfer-pipe at the point $n$, thus forming a common form of ejector capable of producing a very powerful suction through pipe V whenever a stream of water is permitted to pass through said transfer-pipe. A valve, $v$, is located in pipe V, which preferably consists of an ordinary gate-valve having its stem extended into a cylinder, W, and connected to a piston within said cylinder, so that said valve can also be automatically operated by the admission of fluid or liquid under pressure to opposite ends of said cylinder.

The discharging end of the transfer-pipe within the filtering-chamber will preferably be provided with a distributer consisting of a receptacle, Q, having radial pipes $q$ leading therefrom, as shown, whereby the filtering material as it is discharged from said transfer-pipe will be evenly distributed over the entire area of the false bottom.

Assuming that with valves $h$ and $l$ open and the other valves closed the normal operation of the filter has proceeded until the filtering material has become clogged by the sediment and foreign matter eliminated from the water in its passage therethrough, and it becomes necessary to clean the same, the operation of this form of apparatus is as follows: Either manually or automatically the valves $h$ and $l$ are closed, and valves $i$ $v$ and the valves $b$ in head B are opened. Such movement of said valves closes the main-supply and filtered-water-outlet pipes and diverts the supply-stream of water from pipe G H into pipe I, whence it passes through the transfer-pipe into the filtering-chamber through head B. As said stream passes beneath the filter, the powerful suction through pipe V, induced by the ejector $n\ v'$, rapidly draws the filtering material through said pipe V into the transfer-pipe, through which it is carried by the stream of water passing through the latter, and is returned again into the filtering-chamber, being discharged through distributer Q. The filtering-chamber being full of water the filtering material as it descends through the water to the bottom of the chamber is cleaned, and the sediment and foreign matter removed therefrom being of less specific gravity than the filtering material rise to the top of the chamber and pass off through the openings in head B and through pipe X with the excess of water discharged into the chamber by the transfer-pipe. This continuous shifting movement will in a very short time have caused the whole mass of filtering material to be transferred from the bottom of the chamber to the top thereof and back again to the bottom, and by closing valves $v$ and $i$ the shifting movement is stopped and the filter is ready to at once begin its filtering operation again. Before resuming such operation, however, it may in some cases be desirable to cause a reverse current of cleansing-water to pass through the collecting-tubes E to remove any sediment or foreign matter which may have become lodged in the perforations in said tubes, which can be done by opening valve $s$, which permits the supply-stream of water to flow through pipe S, to and through the tubes E, in a reverse direction, thence upwardly through the filtering material and through the openings in head B. Two or three minutes will be ample time within which to accomplish this result, when valve $s$ and valves $b$ in head B will be closed and valves $h$ and $m$ opened. Filtration is now resumed; but the filtered water, instead of passing off through its pipe K L, is diverted into the waste-pipe M for the purpose of removing any surplus cleansing-water which may have remained within the collecting-tubes. Ordinarily two minutes will suffice for this purpose, and then valve $m$ is closed and valve $l$ opened, when the filtered water again passes through its outlet-pipe, and the normal operation of the filter goes on as before until another cleansing of its bed becomes necessary.

The interior construction of valve $h$ is shown in Fig. 1; and it will be understood that valves $b$, $i$, $s$, $l$, and $m$ are or may be of similar construction to said valve $h$.

It will be observed that, owing to the powerful suction created through pipe V and the conformation of false bottom C, which cause the filtering material to constantly seek the mouth of said pipe, the operation of shifting the material from the bottom to the top of the filtering-chamber can be performed with great rapidity. It will be observed, furthermore, that since the discharge of said material into the chamber is exactly commensurate with the exhaust thereof from the chamber the bulk of material within the chamber remains practically the same throughout the operation, whereby the filter is ready to resume its operation as soon as such shifting movement ceases. I am thus enabled to very materially shorten the time required to perform the cleansing operation, as compared with the time consumed by the methods hereinbefore referred to.

By the method just described it will be remembered that the filtering material is discharged into a practically stationary body of water within the filtering-chamber, which in ordinary cases will sufficiently clean said material; but by the same apparatus I am able to create an ascending current of water within the chamber whenever the conditions are such as to render a more positive washing of the material desirable. This result is accomplished by opening valve $s$ simultaneously with the opening of valves $v$ and $i$ in the operation above described, whereby the supply-stream of water passes through pipe S and the collecting-tubes, simultaneously with its passage through the transfer-pipe, to shift the filtering material, and the outlet-pipe K L being closed the water which passes through said pipe S and the collecting-tubes is compelled to ascend within the chamber to and through the openings in head B. The descending particles of filtering material as they pass through this ascending current of water upon being discharged from the transfer-pipe are thoroughly washed and cleaned.

In the last-described method the intermediate step of opening valve $s$ to clean the collecting-tubes after valves $v$ and $i$ are closed is of course omitted, and valves $h$ and $m$ are opened at once after the closing of valves $i$, $s$, $v$, and $b$. I regard the last-described method as being of great importance, for the reason that when using a filter with certain grades of water it is impossible to effectually clean the filtering material by merely passing it through a stationary body of water.

In Fig. 2 I have shown a slight modification of the apparatus shown in Fig. 1, in which the transfer-pipe is concentric at the point where it receives pipe V, and the latter pipe is of slightly greater diameter. As an injector, this formation of the pipes will secure equally good results wherever the supply-stream of water has sufficient "head" to give it a high degree of velocity; but when said stream has but a moderate velocity I prefer to use the first-described construction. I have also shown in said Fig. 2 a regulator, $d$, consisting of a hood or cap secured to the end of pipe V and having slits in its periphery of sufficient width to permit the passage of the particles composing the filtering material therethrough, or perforations may be made therein in lieu of said slits. This regulator causes the filtering material to enter pipe V more slowly than it otherwise would, and can be employed whenever it may be desirable for any reason to thus retard the shifting movement.

In Fig. 3 I have shown still another modification in which the suction which draws the filtering material from the filtering-chamber is produced by a pump instead of by the supply-stream of water, which pump also returns said material to the chamber. In this form of the apparatus the pipe S is omitted, and the pipe I leads directly to the collecting-tubes, as shown. The transfer-pipe is a separate pipe designated by the letters N P, and leads directly from the bottom of the filtering-chamber to and through the head B. A pump, O, is located at any convenient point in the transfer-pipe. I prefer to use the ordinary centrifugal pump, the shaft of which can be operated from any convenient source of power. Ordinarily the consistency of the filtering material will be such that said material will readily pass through the pump whenever the latter is set in motion without additional mixture of water therewith; but in order to render its movement perfectly free whatever the consistency thereof may be I have added a small pipe, R, leading from pipe I into the transfer-pipe, as shown, by means of which a sufficient quantity of water is commingled with the filtering material to cause it to pass through the pump as readily as liquid. The operation of this form of apparatus is the same as that previously described, except that the shifting movement of the filtering material is caused by the pump instead of by the supply-stream of water. The pump upon being set in operation will very rapidly transfer the material from the bottom to the top of the filtering-chamber, and the cleansing operation can be performed either with or without an ascending current of water within the chamber, as in the case of the previously-described operation.

I have omitted to show the distributer Q in Fig. 3 for the reason that said distributer is not essential to the successful operation of either form of apparatus shown; but I prefer to use it because, as previously stated, it causes the filtering material to be evenly distributed over the area of the bottom of the filtering-chamber.

It is obvious that modifications of the apparatus herein described other than those herein mentioned can be made without departing from the spirit of that part of my invention.

Having thus fully described my invention, what I claim, and desire to secure by Letters Patent, is—

1. The combination, with a filter having the usual inlet and outlet openings, of an exteriorly-located primary pipe communicating with the filtering-chamber at or near the top thereof, and a secondary pipe extending downwardly from said chamber at the bottom thereof and having its delivery end located within said primary pipe, whereby a stream of water passing through said primary pipe into the filtering-chamber will create suction through said secondary pipe and draw the filtering material therethrough into said primary pipe, substantially as and for the purpose described.

2. In combination with a filter having the usual inlet and outlet openings, a primary pipe leading into the filtering-chamber at or near the top thereof, said pipe having at a point between its ends a double-trumpet or hour-glass conformation, and a secondary pipe leading from the filtering-chamber at or near the bottom thereof to and into said primary pipe, said secondary pipe terminating in a nozzle which projects into said irregular conformation of the primary pipe, substantially as and for the purpose set forth.

3. In combination with a filter having the usual inlet and outlet pipes and valves for closing the same, a transfer-pipe located outside of the filter and communicating with the filtering-chamber at the bottom and also at the top thereof, and a water-inlet pipe leading into said chamber at or near the bottom thereof, whereby an ascending current of cleansing-water is induced within said chamber simultaneously with the shifting movement of the filtering material, substantially as and for the purpose described.

4. The combination, with a filter having its filtering-chamber provided with the false bottom C, sloping from its center to the sides of said chamber, of the transfer-pipe leading into the chamber at the top thereof, and pipe V, leading from the chamber at the center of the false bottom into said transfer-pipe, said pipes at or near their intersecting point forming the ejector $n\ v'$, substantially as and for the purpose described.

5. The combination, with a filter having a transfer-pipe for shifting the filtering material from the bottom to the top of the filtering-chamber during the process of cleaning the same, of a distributer connected to the transfer-pipe within the filtering-chamber, consisting of the receptacle Q, having the radial pipes $q$ leading therefrom, substantially as described.

6. The combination, with a filter having the false bottom C, head B, provided with valves $b$ and collecting-tubes E, and having pipes G H and K L communicating with its filtering-chamber, of the transfer-pipe leading from pipe G H into said chamber at the top thereof, pipe S, connecting said transfer-pipe with the collecting-tubes, pipe V, leading from the bottom of the filtering-chamber into the transfer-pipe, and valves $h$, $i$, $l$, $s$, and $v$, located in said pipes, as shown, arranged and operating substantially as and for the purpose set forth.

GEORGE H. MOORE.

Witnesses:
W. H. CHAPMAN,
T. M. BROWN.